United States Patent Office 3,071,502
Patented Jan. 1, 1963

3,071,502
PROCESS FOR MANUFACTURE OF
PHOTOELASTIC MEMBERS
Felix Zandman, Paris, France, assignor, by mesne assignments, to The Budd Company, Philadelphia, Pa., a corporation of Pennsylvania
No Drawing. Filed Aug. 1, 1958, Ser. No. 752,430
Claims priority, application France Sept. 18, 1957
2 Claims. (Cl. 156—196)

It is known that to determine stresses or strains, it is possible to use photoelastic sheets or varnishes which are bonded or brushed on the surface where the stress has to be measured. These plastics in the form of sheets or varnish being submitted to the same strain condition as the surface of the part to be tested, afford an instrumentality for measuring the strain in the part by observing or recording the birefringence of the plastic attached to the part. It is relatively simple to make a flat photoelastic sheet for application on flat parts; it has been, however, very difficult or even impossible to do it if the part is not flat. Photoelastic plastic in the form of a liquid can be brushed on the top of the surface of the part which may be flat or curved, but to polymerize this liquid it is necessary to apply heat to the part, which in many cases is a very complicated problem (e.g. as with large constructions such as bridges, airplanes, etc.) and often applying heat is prohibitive. By applying the liquid plastic, the thickness of the coating, in general, is not constant: so as to achieve quantitative or even qualitative results, it is necessary to make measurements of thickness point by point and to correct the birefringence readings, so as to determine point by point the stress value. This fact prolongates the measurements and does not give a true picture of the overall stress distribution by simple fringe observance, since thickness measurements should be made beforehand and all values corrected. Another inconvenience of using liquid plastic to make coatings on curved parts is the fact that during the polymerization of the liquid plastic, thermal stresses can be introduced in the plastic and after cooling the part to room temperature for testing, a color pattern of the birefringence in the plastic may result as a consequence of these thermal stresses, mostly due to the fact that the coefficient of the thermal expansion of the plastic is different from the thermal expansion of the part which has to be studied. A proposal was made to use molds around the curved part, to pour the liquid plastic in the mold, to cure it by applying some heat or by room-temperature polymerization, to remove the mold after the plastic is polymerized and then to proceed with the test. This procedure is very complicated and requires a special mold for every part to be tested. Another inconvenience of this technique is the fact that during the molding, we do not know if air bubbles are trapped in the plastic and also, often accidents happen during removal of the mold, the plastic being broken or sticking to the mold.

The invention which is described here affords the possibility of manufacturing very simple photoelastic sheets of any form, flat or contoured. The invention starts from experimental observation which was made during studies of the transformation which occurs in a plastic during its polymerization (the passage from liquid to solid form). Starting with a plastic in its liquid form, by applying heat to the plastic at a given temperature and maintaining this temperature for a given time, it was found that there exists a given time when the incompletely polymerized plastic exhibits zero or practically zero birefringence when subjected to strains. The invention describes a process for applying a sheet of plastic with constant thickness to a part of any shape without introducing any birefringence in the plastic during the application of it to the part. The liquid plastic, such as epoxy resins in liquid form, for example, mixed with their hardeners, is poured into a flat mold made, for example, of a sheet of polished metal or glass with edges raised or with internal dams, so as to avoid the plastic running out of the mold (the mold being placed level). A given temperature is applied to the mold with plastic inside during a given time (the temperatures are preferably kept constant within a couple of degrees over all the surface of the plastic). After a very precise time of heating at the characteristic temperature the liquid plastic will be formed into a solid sheet, but not fully polymerized. At this stage the sheet can be removed from the mold (the mold being previously coated with silicone varnish or other lubricant, so as to avoid sticking of the plastic to the mold) and curved, machined, cut or strained in any manner without inducing appreciable birefringence in the plastic, the photoelastic constant of the plastic at that stage being zero or very low. At this stage of polymerization the sheet is deformable like rubber. In other terms, it can be said that it was observed that there is, between the liquid stage of the plastic and its completely solid stage (where the plastic has a high sensitivity to strain in terms of birefringence), an intermediate stage sufficiently near to the solid stage, so as to allow the plastic to be manipulated and to apply it to any curved or flat part without introducing birefringence in the plastic.

The partially polymerized sheet being applied to a given contour will progressively change its state of polymerization. The speed of this change will depend on the temperature of the part on which the plastic was applied—room temperature, for example. Finally, after complete polymerization, the contoured sheet will exhibit a high sensitivity to birefringence when strains are applied to it directly or through a part to which this sheet may be bonded. The attaching of the sheet to the part as for example to a shaft for torque measurements (by bonding it to the part) can be done during the time when the photoelastic effect is substantially zero or the sheet can be fully polymerized on the top of the part without applying any cement, and cementing can be done at a later date: the photoelastic sheet will preserve the contoured form permanently.

The time when the photoelastic effect is substantially zero is sufficiently long to permit practical and easy application of the sheet onto a given part without undue haste.

The invention also relates to the process of rapidly lowering the temperature of the shaped plastic sheet immediately after removing the sheet from the mold and while its photoelastic coefficient is still about zero. The polymerization will not continue if sufficiently low temperatures are maintained (freezing temperature or below). This sheet may be preserved in a refrigerator or in dry ice or in any other low-temperature system. When the plastic is brought back to room temperature, it is again shapable during a given time without introducing any internal birefringence. It is also possible to apply a small amount of heat, by using infrared for example, so as to give a little more plasticity to the sheet. However, the higher the heat applied to the sheet, the less time is available to contour the sheet, i.e. the less time during which the photoelastic constant is zero.

The term "photoelastic material" as used herein refers to material which exhibits changes in optical properties when subjected to stresses, i.e., when in the unstressed condition they are isotropic and become anisotropic when stressed. Those materials are usually isotropic, transparent or translucent, dielectric materials which are generally long-chain polymers and include, but are not limited to, epoxy resins, i.e., resins having the general chemical formula

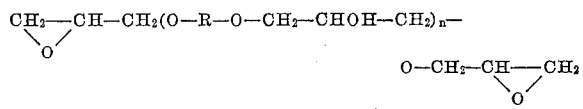

wherein R represents an aromatic group; polyvinyl acetate, cellulosic sheet material, polymers of methyl methacrylate, polyesters, urea-formaldehyde and melamine formaldehyde resins, and gelatins.

The photoelastic liquid plastic material, when an epoxy resin, may be heated during 50 minutes at a temperature of 45° to 50° C. after being poured into a flat, horizontal mold without a top and coated previously with silicone. This heating provides a sheet of plastic which can be shaped into any form such as cylindrical forms for applying on tubes or shafts on which it may be necessary to measure subsequently with polarizing instruments the torque, or on spherical forms or on undulating forms such as the skins of airplanes, etc. The sheet of plastic is attached to the part by a cement which will transmit the strain to the sheet without creep and which will exhibit optical and mechanical properties similar to those of the sheet itself. After 24 hours of polymerization at room temperatures, or higher temperatures if necessary, the sheet is fully polymerized; the cement is also fully polymerized and the test can be started. The conditions of heating are of a critical character. This means that the temperature and the time of heating should be equal or near to those indicated. In this respect, if the temperature can vary within 10° for a given plastic, the time of heating should be precise and within minutes. Under those conditions, the sheet of plastic will retain for about one hour the property of zero or practically zero photoelastic effect.

The invention relates also to adding different proportions of hardener and/or plasticizer to the liquid plastic in such a manner as to retard the complete polymerization or to advance it during the period of first curing in the mold and/or during the period of curing at room temperatures when the plastic is applied directly to the part. The manner indicated before will provide then a photoelastic sheet of a constant thickness and high photoelastic effect exhibiting no internal birefringence when applied to any part, flat or contoured.

While various examples of the manner and practice of this invention have been given hereinabove, and without implying any restriction except as recited in the appended claims, a specific example of practice according to this invention follows:

Material: A substantially unpolymerized polymerizable material which is a liquid in an initial substantially unpolymerized state, a plastic solid deformable without becoming birefringent in an intermediate partially polymerized state, and a rigid solid exhibiting forced-birefringence in the final substantially polymerized state, e.g., substantially unpolymerized, liquid, epoxy resin.

(1) The epoxy resin in its initial state is placed in a mold, e.g., poured into a flat open-top horizontal mold.

(2) The epoxy resin is partially polymerized while in the mold until its intermediate state of polymerization is reached (a rubber-like consistency) e.g., heated during 50 minutes at a temperature between 45° and 50° C.

(3) The epoxy resin in its intermediate state is removed from the mold and while in its intermediate state, e.g., within one hour, shaped to a given contour, e.g., that of a shaft.

(4) The contoured epoxy resin is thereafter substantially fully polymerized, e.g., by heating at room temperature for 24 hours.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The process of manufacture of a uniform thickness photoelastic testpiece having a given contour from a polymerizable material which is a liquid in an initial substantially unpolymerized state, a plastic solid deformable without becoming birefringent in an intermediate partially polymerized state, and a rigid solid exhibiting forced-birefringence in a final substantially polymerized state, which process comprises the steps of confining the material in its initial state in a mold, partially polymerizing the material while in the mold until its intermediate state of polymerization is reached, removing the material from the mold and conforming the material to the given contour while in its intermediate state, and thereafter continuing polymerization of the material while it is so conformed until it is in its final substantially polymerized state, whereby the resultant contoured forced-birefringent testpiece is substantially isotropic in the absence of externally applied loads.

2. The process of manufacture of a uniform thickness photoelastic testpiece having a given contour from a polymerizable material which is a liquid in an initial substantially unpolymerized state, a plastic solid deformable without becoming birefringent in an intermediate partially polymerized state, and a rigid solid exhibiting forced-birefringence in a final substantially polymerized state, which process comprises the steps of confining the material in its initial state in a mold, partially polymerizing the material while in the mold by heating the material until its intermediate state of polymerization is reached, removing the material from the mold and discontinuing polymerization of the material while in its intermediate state by refrigerating the material, conforming the material to the given contour while in its intermediate state, and thereafter continuing polymerization of the material by heating the material while it is so conformed until it is in its final substantially polymerized state, whereby the resultant contoured forced-birefringent testpiece is substantially isotropic in the absence of externally applied loads.

References Cited in the file of this patent

UNITED STATES PATENTS 2,041,138    Land _____ May 19, 1936
2,596,162    Muskat _____ May 13, 1952

OTHER REFERENCES

"Epoxy Adhesives and Casting Resins as Photoelastic Plastics," U.S. Army Ordnance Corps, 1954, Code No. Report PB 111456, Office of Technical Services, Dept. of Commerce.